United States Patent
Glensvig et al.

(10) Patent No.: US 6,779,498 B2
(45) Date of Patent: Aug. 24, 2004

(54) INTERNAL COMBUSTION ENGINE OPERATING ON SPARK-IGNITABLE FUEL

(75) Inventors: Michael Glensvig, Graz (AT); Franz Chmela, Graz (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 10/291,673

(22) Filed: Nov. 12, 2002

(65) Prior Publication Data

US 2003/0111032 A1 Jun. 19, 2003

(30) Foreign Application Priority Data

Nov. 15, 2001 (AT) ........................................ GM881/2001

(51) Int. Cl.$^7$ ................................................. F01L 1/34
(52) U.S. Cl. ......................... 123/90.16; 74/25; 74/53; 74/54; 123/90.15; 123/90.22
(58) Field of Search ............................. 74/53, 54, 55, 74/567, 568 R, 569, 25; 123/90.15, 90.16, 90.17, 90.18, 90.24, 90.25, 90.26, 90.31, 90.22, 90.23

(56) References Cited

U.S. PATENT DOCUMENTS

| | | | | |
|---|---|---|---|---|
| 2,510,465 A | * | 6/1950 | Ellis | 74/53 |
| 2,971,382 A | * | 2/1961 | Harris | 74/3.52 |
| 5,546,914 A | | 8/1996 | Scheinert | |
| 5,603,292 A | | 2/1997 | Håkansson | |
| 5,642,692 A | * | 7/1997 | Wride | 123/90.16 |
| 5,988,125 A | * | 11/1999 | Hara et al. | 123/90.16 |
| 6,053,134 A | * | 4/2000 | Linebarger | 123/90.16 |

FOREIGN PATENT DOCUMENTS

| | | |
|---|---|---|
| AT | 003135 | 10/1999 |
| DE | 3022188 | 12/1981 |
| JP | 2000213318 | 8/2000 |

* cited by examiner

Primary Examiner—Thomas Denion
Assistant Examiner—Jaime Corrigan
(74) Attorney, Agent, or Firm—Dykema Gossett PLLC

(57) ABSTRACT

An internal combustion engine operating on spark-ignitable fuel, which features at least one operating mode with homogeneous charge and self-ignition, and which includes at least one intake valve and at least one exhaust valve per cylinder, which can be coupled via a transmission device in at least one operating mode of the engine, has its combustion process be controlled in a simple manner by providing that at least one exhaust valve can be actuated during the intake stroke by means of the transmission device, the transmission device having at least one first mechanical transmission member, and the transmission device being activated by a mechanical actuating device featuring an eccentric element acting on a transmission member.

11 Claims, 3 Drawing Sheets

INTERNAL COMBUSTION ENGINE OPERATING ON SPARK-IGNITABLE FUEL

BACKGROUND OF THE INVENTION

The invention relates to an internal combustion engine operating on spark-ignitible fuel, featuring at least one operating mode with homogeneous charge and self-ignition, and comprising at least one intake valve and at least one exhaust valve per cylinder, which intake and exhaust valves may be coupled via a transmission device in at least one operating mode of the engine.

By spark-ignitible fuel any conventional fuel of relatively high octane number is understood, such as gasoline.

The crucial determinants for the combustion process in an internal combustion engine are the timing of the combustion process or beginning of combustion, maximum rate of increase of the cylinder pressure, and peak pressure.

As regards an internal combustion engine in which combustion is essentially due to self-ignition of a homogeneous fuel-air mixture, these determinants are established by controlling charge composition and charge temperature curve. These two parameters in turn are determined by a large number of variables, such as engine speed, amount of fuel, intake temperature, charge pressure, effective compression ratio, inert gas content of the cylinder charge, and component temperature.

It has been found that charge temperature is of special importance in controlling the velocity of the chemical processes taking place during ignition delay and combustion proper. A most efficient means of raising charge temperature is an increase in the amount of residual gas, i.e., the content of non-scavenged exhaust gas from the previous combustion cycle remaining in the cylinder charge for the following cycle.

DESCRIPTION OF PRIOR ART

In AT 003 135 U1 an internal combustion engine is described, which in at least one operating mode burns a homogeneous fuel-air mixture by self-ignition of a fuel that is both spark-igniting and self-igniting, especially gasoline. In this way low-emission operation may be obtained at part-load. In order to control under part-load conditions the amount of residual gas internally recycled to increase charge temperature, a variable valve timing system is provided by which the closing time of at least one exhaust valve may be varied in dependence of engine operating parameters. Internal exhaust gas recirculation and control of the residual gas content in the combustion chamber will lead to a rise of the amount of inert gas, however. In order to be able to independently control the beginning of combustion and maximum combustion rate, it would be necessary to provide for control of the inert gas content independently of temperature requirements.

U.S. Pat. No. 5,546,914 presents a system for exhaust gas recirculation in a diesel engine, which includes an auxiliary element for activation of at least one of the intake valves during the exhaust stroke, thus permitting partial recirculation of the exhaust gas into the intake system. The valve timing device is conceived as a hydraulic unit and has a pumping piston and a working piston which are connected via a hydraulic chamber. The pumping piston is connected to a rocker arm of the exhaust valve and the working piston to a rocker arm of the intake valve, the pumping piston actuated by the exhaust rocker arm hydraulically acting on the working piston, which in turn acts on the intake valve in opening direction. By means of a solenoid valve forming the auxiliary element the hydraulic chamber may be hydraulically pressurized, resulting in an opening of the intake valve during the exhaust stroke. In this way an internal exhaust recirculation is obtained, where the exhaust gas is cooled down in the intake port until the inlet period sets in. The known system favors cooling of the exhaust gas in order to improve charging efficiency and nitrogen oxide emissions.

In low-temperature combustion systems used in engines operating on the HCCI (homogeneous charge compression ignition) principle, however, the internal exhaust gas recirculation serves the purpose of ignition timing by control of charge temperature, where high temperatures of the recycled exhaust gas are desirable.

U.S. Pat. No. 5,603,292 discloses a valve mechanism for an internal combustion engine comprising at least one intake valve and one exhaust valve. Intake and exhaust valves are driven by a camshaft via one rocker arm each. A mechanical transmission device permits opening of the exhaust valve at the same time as the intake valve moves towards its opening position. The transmission comprises a shaft with one pivot arm each in the area of intake and exhaust rocker arms. Via the shaft the rocker arm of the intake valve acts on the rocker arm of the exhaust valve in opening direction. In this way an internal exhaust gas recirculation may be accomplished even if the pressure ratio between exhaust and intake side is unfavorable. By an axial shift of the shaft the transmission device can be activated and deactivated by means of an hydraulic actuating device. Hydraulic actuation requires considerable design and control efforts, however.

SUMMARY OF THE INVENTION

It is the object of the present invention to permit improved control of the combustion process of low temperature combustion systems.

According to the invention this object is achieved by providing that at least one exhaust valve can be actuated during the intake stroke by means of the transmission device, said transmission device having at least one first mechanical transmission member, and that the transmission device be activated by a mechanical actuating device, said actuating device featuring an eccentric element acting on a transmission member. During this process a defined amount of hot exhaust gas is returned from the engine exhaust side into the cylinder, thus raising the charge temperature in the desired manner. At least one exhaust valve and one intake valve will be coupled and simultaneously operated during the intake stroke by the transmission device.

Activation of the transmission device is thus accomplished via a mechanical actuating device, which is preferably formed by an eccentric element acting on a transmission member. This results in a simple design for a low-cost control system.

According to a particularly simple embodiment of the invention the first transmission member is formed by a preferably two-armed tiltable first lever, whose first lever arm may be mechanically connected to intake actuation means of the intake valve and whose second lever arm may be mechanically connected to exhaust actuation means of the exhaust valve, in a direct or indirect manner, the lever actuated by the intake actuation means acting mechanically on the exhaust actuation means and activating them in the direction of the exhaust valve opening. If the camshaft is situated below the cylinder head the transmission member may directly cooperate with the intake actuation means and exhaust actuation means.

In the instance of an overhead camshaft, however, it will be better to provide for the intake actuation means to act indirectly on the first transmission member, via a second mechanical transmission member, which is preferably formed by a preferably two-armed tiltable second lever. As an alternative it may be provided that the first transmission member act indirectly on the exhaust actuation means via a second mechanical transmission member, which is preferably formed by a preferably two-armed tiltable second lever.

For operation of the transmission device the proposal is put forward that mechanical contact be established between the transmission member and the intake and/or exhaust actuation means via the eccentric element. In a particularly simple variant the eccentric element acts on the first lever in the area of the lever pivot axis, the first lever preferably turning about the lever pivot axis on the eccentric element.

BRIEF DESCRIPTION OF THE DRAWINGS

The invention will be further described below, with reference to the accompanying drawings, in which.

Parts of the same function have identical reference numerals in both variants.

DETAILED DESCRIPTION OF THE PREFERRED EMBODIMENTS

Figure 1A:
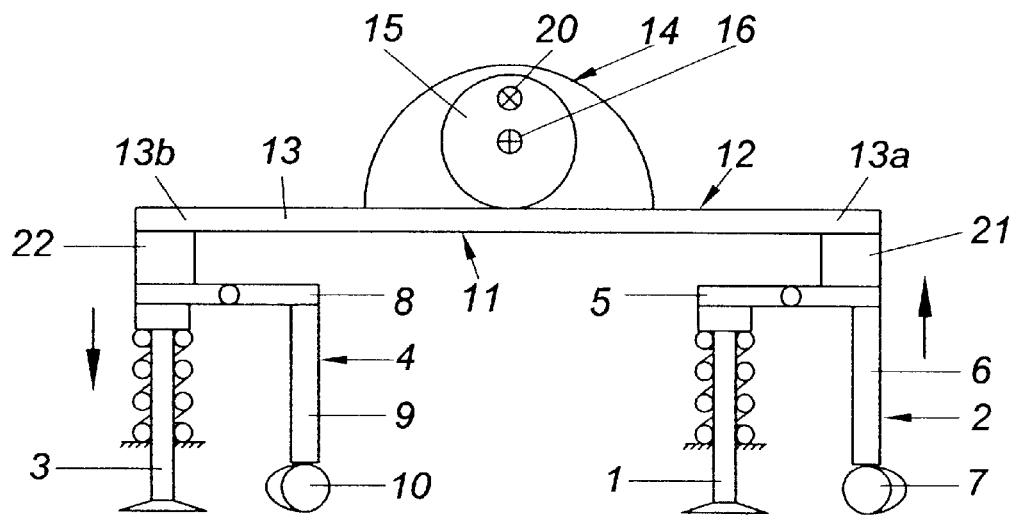
FIG. 1a is a schematical view of a valve timing device of an internal combustion engine according to the invention, presenting a first variant in the activated state.
Figure 1B:
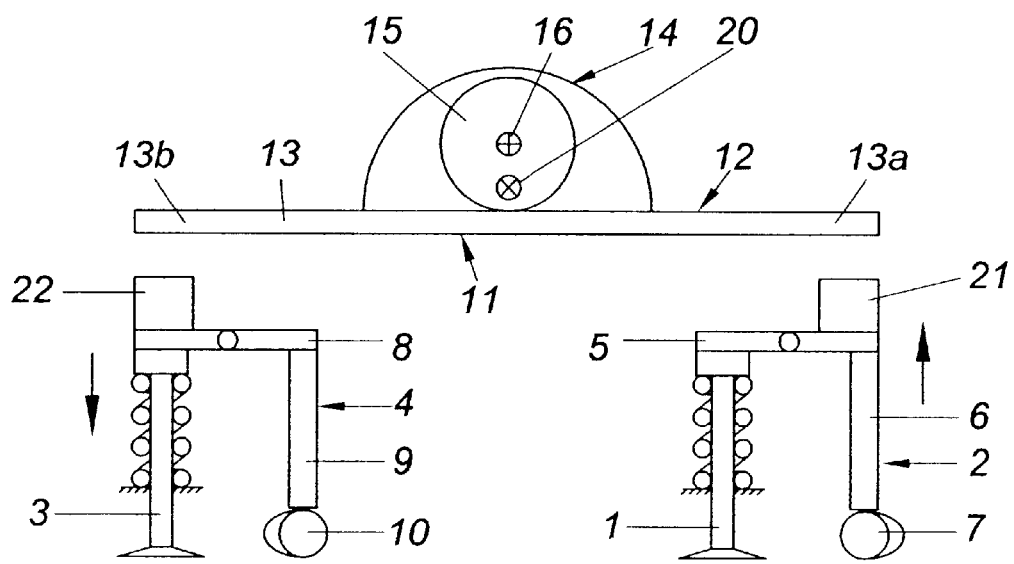
FIG. 1b shows this valve timing device in the deactivated state.
Figure 2A:
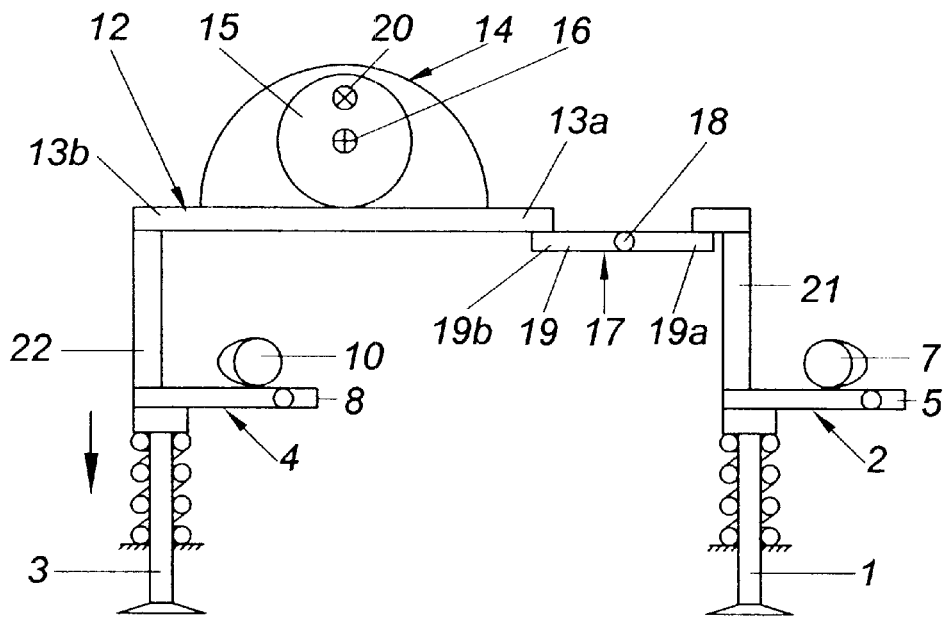
FIG. 2a is a schematical view of a valve timing device of an internal combustion engine according to the invention, presenting a second variant in the activated state.
Figure 2B:
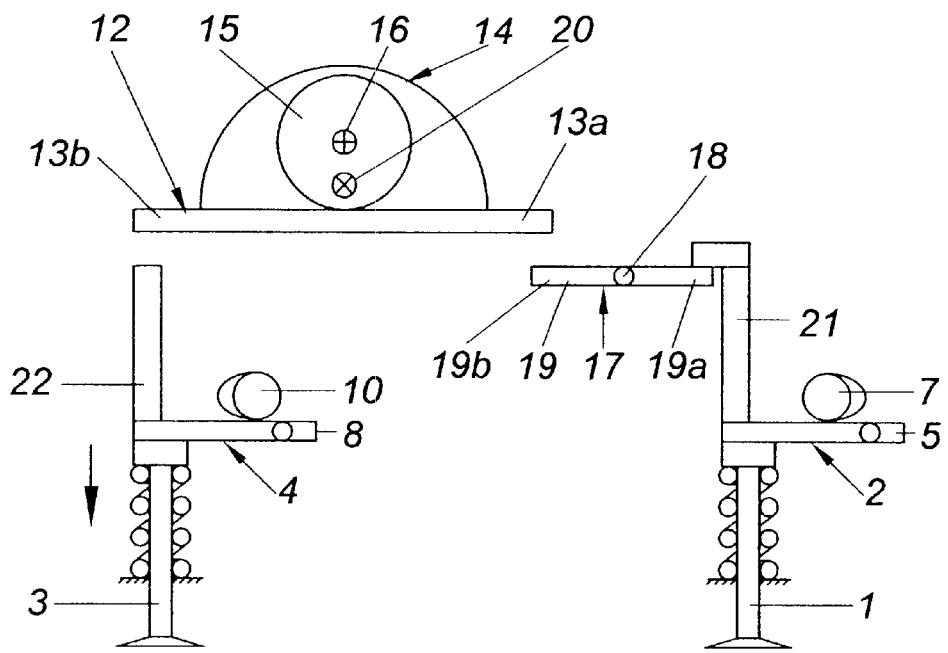
FIG. 2b shows this valve timing device in the deactivated state.

The intake valve 1 is operated via intake actuation means 2, and the exhaust valve 3 via exhaust actuation means 4. In the variant shown in FIGS. 1a and 1b the intake actuation means 2 comprise an intake valve lever 5 and an intake push rod 6 and an intake camshaft 7. The exhaust actuation means 4 comprise an exhaust valve lever 8 and an exhaust push rod 9 and an exhaust camshaft 10. FIGS. 2a and 2b show a variant with overhead intake and exhaust camshafts 7 and 10, respectively, acting directly on the intake valve lever 5 and exhaust valve lever 8, respectively. An intermediate part 21 and 22, respectively, is rigidly attached to the intake valve lever 5 and exhaust valve lever 8, respectively. Valve levers 5, 8 may be configured as rocker arms or cam followers.

In at least one operating mode of the engine, in which combustion of a homogeneous gasoline-air mixture is initiated by self-ignition, intake valve 1 and exhaust valve 3 are coupled to each other during the inlet period by means of a transmission device 11, so that the exhaust valve 3 will open simultaneously with the intake valve 1 during the intake stroke. By this opening of the exhaust valve 3 a defined volume of hot exhaust gas will be recirculated from the exhaust system into the cylinder. The subsequent temperature rise of the cylinder charge will permit control of both the ignition point and combustion process.

The transmission device 11 has a first mechanical transmission member 12 formed by a tiltable two-armed first lever 13 with a first lever arm 13a and a second lever arm 13b. The transmission device 11 is activated and deactivated by a mechanical actuating device 14, which is provided with an eccentric element 15 rotating about an axis 20, via which the first lever 13 can be brought into mechanical contact with the intake actuation means. This contact is established by shifting the first transmission member 12 towards the intake actuation means 2 and exhaust actuation means 4. In the activated state of the transmission device 11 the first lever 13 rests on the intermediate parts 21 and 22, respectively, so that every displacement of the intermediate part 21 is directly transmitted onto the first lever 13 and from there onto the intermediate part 22, the first lever 13 turning about the lever pivot axis 16 on the eccentric element 15.

In the variant shown in FIGS. 2a and 2b the intake actuation means 2 act on the first transmission member 12 indirectly via a second mechanical transmission member 17, formed by a tiltable two-armed second lever 19 turning about a pivot axis 18, whose first lever arm 19a may be brought into mechanical contact with the intermediate part 21, and whose second lever arm 19b may be brought into mechanical contact with the first lever arm 13a of the first lever 13. First and second transmission members 12, 17 may thus be operated in series. In the activated state shown in FIG. 2a the intake valve lever 5 acts on the second lever 19, displacing it via the intermediate part 21. The second lever 19 transmits this movement onto the first lever 13, which in turn transmits it via the intermediate part 22 and the exhaust valve lever 8 onto the exhaust valve 3.

Figure 3:
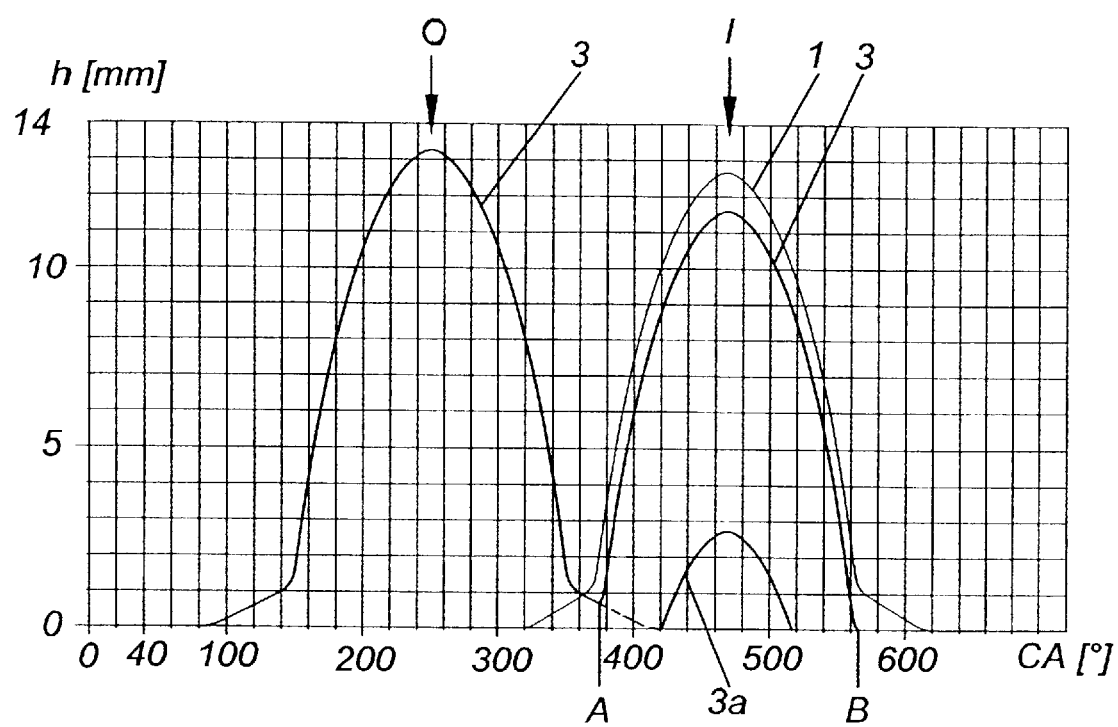
FIG. 3 is a valve lift/crank-angle diagram.

In the diagram of FIG. 3 valve lift h is plotted against crank angle CA for intake valve 1 and exhaust valve 3, O designating the exhaust period and I the inlet period. During the inlet period I the exhaust valve 3 and intake valve 1 are synchronized between the beginning of activation A and end of activation B. The broken line marks the valve lift h of the exhaust valve 3 when the transmission device 11 is not actuated. Curve 3a shows another example of an opening of the exhaust valve 3 during the inlet period I.

By means of the transmission device 11 it will be possible to internally recycle exhaust gas from the exhaust side in a controlled manner as required, in a simple way and without the use of external energy sources.

What is claimed is:

1. Internal combustion engine operating on spark-ignitable fuel, featuring at least one operating mode with homogeneous charge and self-ignition, and comprising intake actuation means comprising an intake cam shaft for at least one intake valve and exhaust actuation means comprising an exhaust cam shaft for at least one exhaust valve per cylinder, which intake and exhaust valves may be coupled via a transmission device in at least one operating mode of the engine, wherein at least one exhaust valve can be actuated during an intake stroke by means of the transmission device, said transmission device having at least one first mechanical transmission member, and wherein the transmission device is activated by a mechanical actuating device, said actuating device including an eccentric element acting on a transmission member.

2. The internal combustion engine according to claim 1, wherein the first transmission member is formed by a two-armed tiltable first lever whose first lever arm may be mechanically connected to said intake actuation means of the intake valve and whose second lever arm may be mechanically connected to said exhaust actuation means of the exhaust valve, in a direct or indirect manner, the first lever actuated by the intake actuation means acting mechanically on the exhaust actuation means and activating them in the direction of the exhaust valve opening.

3. The internal combustion engine according to claim 1, wherein the intake actuation means act indirectly on the first transmission member, via a second mechanical transmission member.

4. The internal combustion engine according to claim 3, wherein the second mechanical transmission member is formed by a tiltable second lever.

5. The internal combustion engine according to claim 4, wherein the second level is two-armed.

6. The internal combustion engine according to claim 1, wherein the first transmission member acts indirectly on the exhaust actuation means via a second mechanical transmission member.

7. The internal combustion engine according to claim 6, wherein the second mechanical transmission member is formed by a tiltable second lever.

8. The internal combustion engine according to claim 7, wherein the second lever is two-armed.

9. The internal combustion engine according to claim 1, wherein mechanical contact can be established between the transmission member and at least one of the intake actuation means and the exhaust actuation means via the eccentric element.

10. The internal combustion engine according to claim 1, wherein the eccentric element acts on the first lever in an area of a lever pivot axis.

11. The internal combustion engine according to claim 10, wherein the first lever turns about the lever pivot axis on the eccentric element.

\* \* \* \* \*